United States Patent [19]
Bennett et al.

[11] Patent Number: 5,522,954
[45] Date of Patent: Jun. 4, 1996

[54] NON-CONTACT BONDING OF PLASTICS

[75] Inventors: Kelvin J. Bennett, Tipton; Andrew L. Bentley, Jr., Goodrich, both of Mich.

[73] Assignee: Ford Motor Company, Dearborn, Mich.

[21] Appl. No.: 304,350

[22] Filed: Sep. 12, 1994

[51] Int. Cl.$^6$ .................................................. B32B 31/00
[52] U.S. Cl. ......................... 156/64; 156/272.2; 156/322; 156/359; 156/380.9; 219/492
[58] Field of Search .................................. 156/64, 272.2, 156/322, 359, 380.9, 499; 219/411, 490, 492

[56] References Cited

U.S. PATENT DOCUMENTS

| | | | |
|---|---|---|---|
| 3,654,013 | 4/1972 | Willsie et al. | 156/212 |
| 3,836,751 | 9/1974 | Anderson | 219/411 |
| 3,883,369 | 5/1975 | Badger et al. | 156/272.2 X |
| 4,052,593 | 10/1977 | Ebert | 219/411 X |
| 4,214,935 | 7/1980 | Nagai | 156/272.2 |
| 4,339,303 | 7/1982 | Frisch et al. | 156/272.2 X |
| 4,694,143 | 9/1987 | Nishimura et al. | 219/411 X |
| 4,698,767 | 10/1987 | Wensel et al. | 364/471 |
| 4,820,365 | 4/1989 | Brumm et al. | 156/359 X |
| 4,935,077 | 6/1990 | Ellers | 156/272.2 X |
| 5,151,149 | 9/1992 | Swartz | 156/379.8 |

OTHER PUBLICATIONS

Metals Handbook Ninth Edition, vol. 6, "Welding, Brazing, and Soldering", 1983, pp. 655–657.

*Primary Examiner*—David A. Simmons
*Assistant Examiner*—Paul M. Rivard
*Attorney, Agent, or Firm*—Donald A. Wilkinson; Roger L. May

[57] ABSTRACT

Controlled infrared heat is used to bond plastic parts (50) together. A fixture (14) includes platens (20, 26) to hold the parts (50) in spaced and aligned relationship during the heating phase of the bonding process, and movable supports to press the platens (20, 26) together during the bond forming phase of the bonding process. A screw transfer system (28) is provided to locate infrared heat sources (42) between the parts (50). An operator station (44), having a controller (48), maintains a minimum voltage (V1) in the heat sources (42) until the heat sources (42) are located, and then, increases the voltage to a second level (V2), to correspondingly increase the heat output of heat sources (42), for a first time period. Operator station (44) then increases the voltage to a third level (V3) for a corresponding time period before reducing the voltage, removing the heat sources (42) and pressing parts (50) together to thereby form a bond.

7 Claims, 2 Drawing Sheets

NON-CONTACT BONDING OF PLASTICS

FIELD OF THE INVENTION

The present invention relates to bonding of plastic parts and more particularly to bonding plastic parts together using infrared energy.

BACKGROUND OF THE INVENTION

When one wishes to attach plastic parts together, several processes exist to accomplish this. Among them are methods such as hot air bonding, sonic welding, vibration welding, adhesives, mechanical fasteners and infrared radiant heat.

One, in particular, infrared radiant heat has certain advantages over the other types. Generally, there is a desire to form a strong bond between the two parts quickly at a minimal cost. Additionally, it is preferable that the bonding process avoids touching the surfaces to be bonded themselves where they are to be bonded in order to assure uniform bonds from part to part and to reduce the cost of cleaning the bonding apparatus. Further, in many instances, it is preferable that there be no marring or distortion of the surface on the opposite side from that which is bonded, herein referred to as the viewing surface.

Infrared bonding in general can overcome many of these concerns. Infrared energy can be finitely pinpointed with a focal point or a mask to the exact area to be bonded in order to avoid overheating the plastic in adjacent areas that might cause unwanted distortion in the part. Infrared can heat the bonding surface to a high temperature, thus assuring a strong bond is formed between the two parts. The bonding surface can be heated very quickly with infrared and the timing and amount of heat application can be precisely controlled. Further, with infrared heating, there need be no contact between the heat source and the bonding surfaces of the parts, in order to minimize cleaning requirements for the tooling.

Nonetheless, there are some drawbacks, in general, to using infrared heat to bond plastic parts together. In the case of automotive interiors, for example, there are many parts made of plastic that are bonded to another part, but also need to have their viewing surfaces as distortion and mar free as possible since occupants of the vehicle will be able to see the surfaces. These surfaces are commonly referred to as "class A" surfaces. The need arises, then, to bond plastic parts having "class A" surfaces without burning or marring the surfaces. However, in the general application of focused infrared heat on the bonding surface in such applications, the "class A" surface cannot be prevented from being damaged. The finite focal point, while avoiding overheated adjacent areas is too intense and harms many plastic parts during the heating process. An inherent difficulty in working with infrared radiant heat to bond plastic arises, to heat the bonding surface sufficiently without causing warpage, burning or marring of the "class A" surface. A desire, then, arises to have non-contact focused radiant energy to heat the plastic at the bonding locations of each part, but not full intensity all at once to avoid problems associated with too much intensity. Preferably, this will be done while still minimizing, as much as possible, the time needed to heat the parts during the bonding process.

U.S. Pat. No. 5,151,149 to Swartz (hereafter '149 patent) discloses a method and apparatus for heating plastic for bonding using infrared, which attempts to heat the plastic fairly quickly up to its bonding temperature while avoiding burning the viewing surfaces. It discloses using infrared focused heat sources that move rapidly in repeated patterns to heat the plastic at a given point a little more on each pass.

Nonetheless, this process, as disclosed, has drawbacks in that shaking or rapidly moving the infrared heat sources while operating them causes a mechanical shock to the infrared heat sources and generally will reduce their average useful life. The bulbs typically have tungsten filaments, which, when hot, are prone to breakage from vibration. Start-up shock to the infrared bulbs can also reduce their useful life if started up each time they begin heating a new set of parts. Thus, it is desirable to avoid shaking the filaments of the infrared bulbs while heating in order to lengthen their lives, reducing the wasted time and expense associated with replacing heat sources.

Additionally, it is desirable that the infrared lamps remain fixed during the heat application. First, because it is desirable to keep the beam focused properly to assure the proper amount of heating. The '149 patent discloses moving the heat source throughout the heat application portion of the process, thus making it more difficult to maintain a properly focused beam. The '149 patent, then, discloses the need for a multi-axis robot to position and cycle the heat source to make sure it is focused properly, which is more costly than a simpler positioning mechanism such as a simple one-axis slow moving mechanism. Further, the process, as disclosed, lets the plastic cool slightly between each pass of the focused infrared ray across the particular point, which generally is not an optimum way to heat the plastic parts. It is advantageous to provide for uniform heating of the surfaces to be bonded by heating all of the surface area at the same time and only heating the exact areas needed. This affords maximum surface heat uniformity while creating a minimum of surface distortion. The '149 patent discloses continuously moving the heat source across the surface to be bonded, so it is impossible for this process to maintain the same material temperature across the bond surface at all bonding locations, and is unlikely that it can accurately and uniformly control the surface temperature at the instant of material bond, risking the creation of an unevenly bonded surface.

Accordingly, it is desirable to infrared bond plastic "class A" parts quickly without the drawbacks of prior infrared heat processes, such as discussed above.

SUMMARY OF THE INVENTION

In its embodiments, the present invention contemplates a method for infrared bonding of a plurality of plastic parts on their bonding surfaces comprising the steps of: locating the plurality of parts in alignment with one another such that the bonding surfaces are spaced from one another; inserting at least one infrared heat source between the bonding surfaces; directing a first predetermined amount of infrared heat at the bonding surfaces for a first time period; increasing the amount of infrared heat directed at the bonding surfaces to a second predetermined amount for a second time period; reducing the amount of infrared heat directed at the bonding surfaces; removing the at least one infrared heat source from between the bonding surfaces; and pressing the bonding surfaces together, thereby forming bonds between the plurality of parts.

Accordingly, an object of the present invention is to bond plastic parts having "class A" surfaces together by applying infrared radiant heat, to maintain a quick bonding process, without requiring the use of a multi-axis robot.

An advantage of the present invention is the increased life of the infrared bulbs used for heating the plastic, thereby reducing the cost of bonding using infrared heat.

A further advantage of the present invention is the ease of uniform heating and ease of maintaining proper focal points during the infrared bonding process, to provide a strong, uniform bond between the plastic parts.

BRIEF DESCRIPTION OF THE DRAWINGS

FIG. 3 is an enlarged view of an infrared heat source and focused beam taken from encircled area 3 in FIG. 1.

DETAILED DESCRIPTION OF THE PREFERRED EMBODIMENTS

Figure 1:
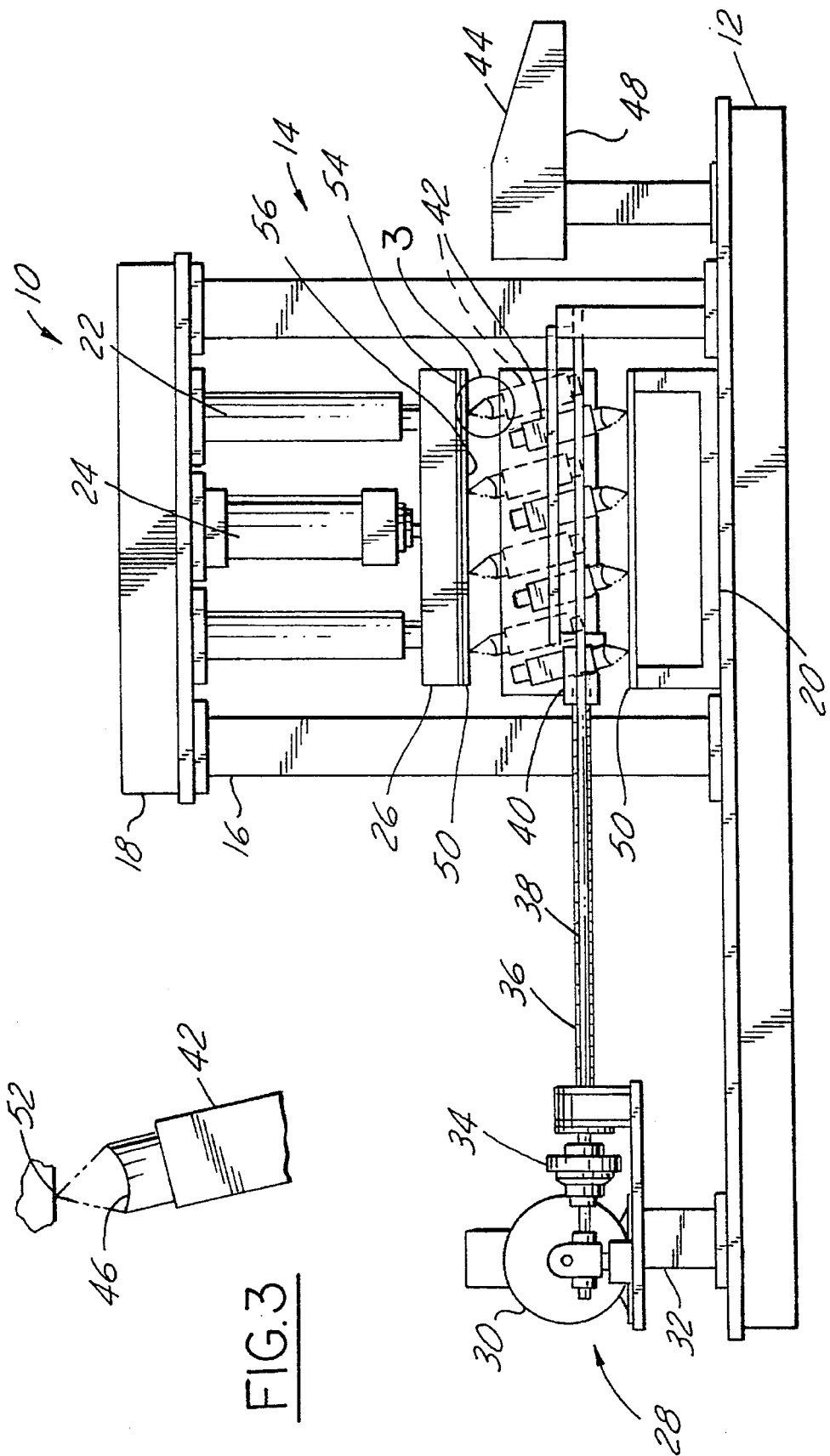
FIG. 1 is a side view of an infrared bonding apparatus in accordance with the present invention.
Figure 2:
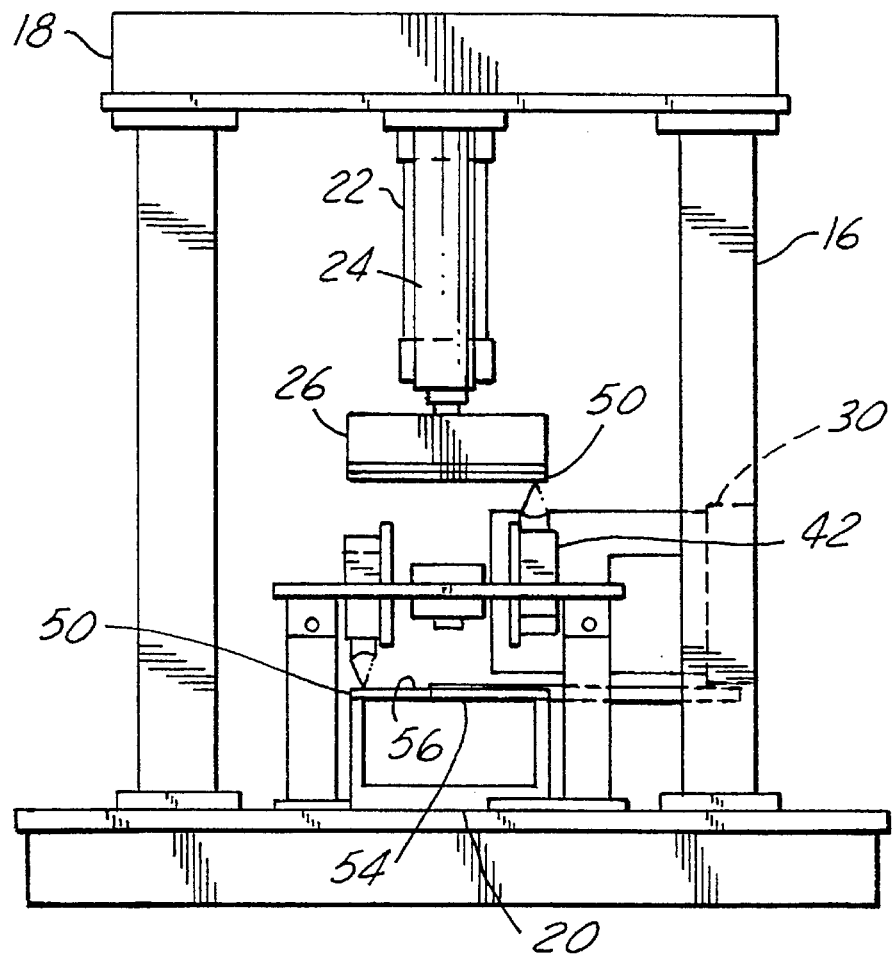
FIG. 2 is an end view of the same infrared bonding apparatus.

As shown in FIGS. 1–3, an infrared bonding apparatus, generally referred to as 10, is mounted on a base 12. Apparatus 10 includes a fixture 14, having vertical support legs 16, mounted between base 12 and an upper support 18. A lower platen 20 is fixed in a stationary manner to base 12 between support legs 16. Mounted to the underside of upper support 18 is a pair of vacuum assist cylinders 22 and a support and locating cylinder 24. These cylinders 22 and 24 are also mounted to an upper platen 26. Cylinder 24 is attached to a conventional hydraulic circuit, not shown, and can be extended or retracted linearly by changing the hydraulic pressure, in order to raise or lower upper platen 26. Cylinder 24 can also be attached to a conventional pneumatic circuit, not shown, instead of a conventional hydraulic circuit, if so desired. Vacuum assist cylinders 22 are connected to a conventional vacuum clamping system, not shown, that creates suction in movable platen 26 in order to mount and securely hold a part in place during the bonding process. This conventional vacuum clamping system is also connected to lower platen 20.

A screw transfer system 28 is mounted to base 12. It includes a lead screw motor 30, mounted to a motor base 32 and connected to a conventional source of electric power, not shown. Lead screw motor 30 is preferably a DC servo motor. A lead screw driver 34 is coupled to lead screw motor 30 and is also coupled to a lead screw transfer 36. Lead screw transfer 36 carries a pallet 40 at one end. Guide bars 38 run parallel to lead screw transfer 36 and cooperate with fixture 14 to help guide and maintain alignment of pallet 40. Pallet 40, in the embodiment shown, has four pairs of infrared heat source assemblies 42 mounted to it. Lead screw driver 34 can cause lead screw transfer 36 to move linearly and pull pallet 40 toward it or push it away along the path of guide bars 38. In this way, infrared heat sources 42 can be moved in between platens 20 and 26 for heating parts and removed when finished heating.

Each of the heat sources 42 include commercially available lamps with parabolic/elliptical reflectors 46. The lamps 46 are preferably infrared heat bulbs having tungsten filaments and integral parabolic reflectors. Heat sources 42 are mounted to pallet 40 so that each of the heat sources 42 in a pair will heat an opposing and aligned spot on parts 50 to be bonded together, although other arrangements of heat sources 42 can also be used. Infrared heat sources 42 and lead screw motor 30 are both electronically connected to an operator station 44.

Operator station 44 includes a controller 48, which can be comprised of conventional relay logic, programmable logic and/or a computer. It will control the timing, amount and direction of movement of motor 30, and also the timing and intensity of power sent to infrared sources 42. Preferably, a Programmable logic controller controls the power input to infrared heat sources 42. The conventional vacuum assist and hydraulic systems are also controlled by operator station 44, but could be operated manually, if so desired.

The process of bonding plastic parts together will now be described. Joining of plastic parts 50 to each other is effected by application of heat to selected surface areas thereof by intense focused infrared heat produced by heat sources 42. To begin the bonding process two, or more, parts 50 are properly oriented and placed in fixture 14, on upper platen 26 and lower platen 20. The conventional vacuum clamp system is activated and holds the parts securely in place to assure proper alignment when bonded.

After parts 50 are secured in place, operator station 44 will send a signal activating screw transfer system 28, which slides pallet 40, along with infrared heat sources 42, between parts 50. Infrared heat sources 42 will be mounted in pallet 40 so that their parabolic reflectors 46 are adjacent to parts 50.

Screw transfer system 28 provides controlled positioning and movement with minimal mechanical shock to infrared heat sources 42 since DC servo motor 30 operates smoothly and does not jar them. To further assure minimal jarring of heat sources 42, which typically are fragile, the logic of operator station 44 causes motor 30 to slow down just before stopping at the appropriate location when inserting heat sources 42.

Each of the parabolic reflectors 46 has a focal point 52. Focal points 52 can be adjusted through mechanical positioning of infrared sources 42 when being mounted in pallet 40 based on the predetermined positioning of platens 20 and 26, to assure proper focal point to part distance. Preferably, each focal point 52 is adjusted so that the heat is substantially at a maximum intensity at the location of desired bonding between parts 50, herein referred to as a bonding zone.

With heat sources 42 in place and platens 20 and 26 securely holding parts 50, both heat sources 42 and parts 50 will remain substantially stationary during the heating phase of the bonding process. By remaining stationary, this allows for accurate maintenance of the proper focal point to part distances and bonding zone locations during the heating phase without the cost of equipment for mechanically maintaining the proper focal point and bonding zone location needed if either the parts 50 or the heat sources 42 were moving during the heating phase.

Figure 4:
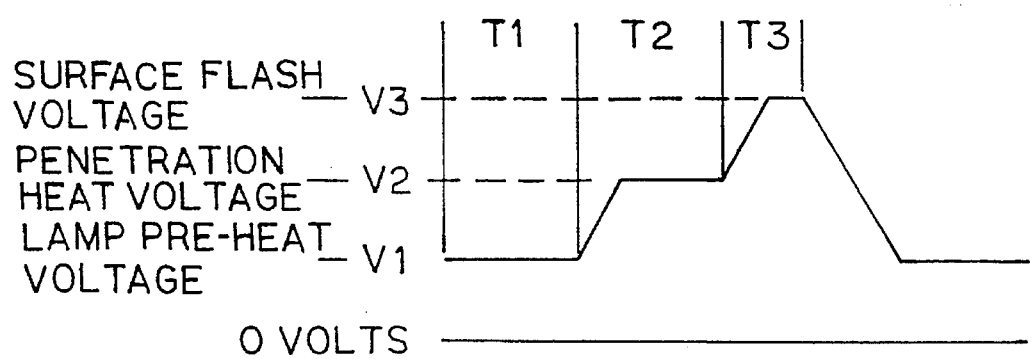
FIG. 4 is a graphical representation of the voltage versus time of application of the heat to the bonding region on the parts.

FIG. 4 shows the preferred ramp up of power input to heat sources 42, which controls the intensity of the infrared beams, to assure a strong bond on bonding surfaces 56 of parts 50 while avoiding burning or marring viewing surfaces 54.

Operator station 44 allows a small amount of power to be continuously sent to heat sources 42 in order to maintain a lamp pre-heat voltage V1, which is very low. This minimizes any thermal shock associated with start-up of infrared bulbs, extending the useful life of the filaments in the bulbs of heat sources 42. This low power state is continued for a time T1 until heat sources 42 and parts 50 are aligned and the actual bonding heating is ready to begin. Operator station 44 increases the power sent to heat sources 42 by having voltage V1 ramped up to a penetration heat voltage V2, which correspondingly increases the heat intensity of heat sources 42. This voltage determines the heating rate of the plastic material at the bonding locations, and is applied for a predetermined time T2, which generally determines the heating depth into the plastic at the bond locations. Operator station 44 then increases the power sent to heat sources 44 by ramping up to a surface flash voltage V3, which correspondingly increases the heat intensity of the heat sources 42 again. This heats bonding surfaces 56 at the bonding locations to the molten condition needed for bonding plastic parts 50. This voltage is applied for a predetermined time T3, a surface flash time. After reaching T3, operator station 44 reduces the voltage applied to heat sources 42 back to V1. The overall ramp up of applied heat brings the surface temperature of the bonded material to the required bonding temperature and allows for a deeper melt into the plastic without destroying viewing surfaces 54. All of the bonding zones are heated uniformly and at the same time. This affords maximum surface heat uniformity while creating a minimum of surface distortion.

Controller 48 monitors the ramp time of heating, the watt seconds of total power delivered to the bonding surfaces, the hold time at each heat level and the overall cycle time. Controller 48 can also be programmed to utilize a ramp up-slope of applied amperage to increase the power to heat sources 42, rather than ramp-up of applied voltage. It also may be programmed to vary the power to the heat sources by varying the pulse width modulation or the phase modulation. Also, the ramping need not be strictly linear, as is disclosed in this embodiment.

Immediately after the heating phase of the bonding process, operator station 44 again activates screw transfer system 28 and heat sources 42 are pulled away from parts 50. Operator station 44 immediately activates the conventional hydraulic system to move upper platen 26 toward lower platen 20 until heated bonding surfaces 56 are pressed together. Controller 48 monitors the clamp time and the clamp pressure for holding parts 50 together to assure a good bond.

Further, in order to assure good consistent bonding, a monitoring process is used during the heating phase of the bonding process. The applied energy to each heat source 42 is individually monitored. The wattage consumption measurement for each of the heat sources 42 is added together and then divided by the number of heat sources 42 to produce an average. This average is measured during each one second, or other convenient, time period of the heating phase of the bonding process. The average measurement for all one second periods are added together to yield applied energy expressed as watt seconds. Degradation of a heat source 42 occurs as tungsten "boils" off of the surface of the filament of its bulb and deposits on the inside of its glass envelope. As the cross-section of a tungsten filament is gradually reduced over time, less current is drawn. Failure of a typical tungsten heat lamp is usually associated with a 10% reduction in current draw. Controller 48 monitors the applied energy for each heat source 42. Since the current is made available to the lamp at a known rate, if a particular heat source 42 draws less than 90% of the available current, a fault condition for that heat source 42 is displayed at operator station 44 and an operator can then replace the worn bulb to assure proper heating at all bond locations.

As an alternative to focussing the infrared beams, a mask may be used for selective heating of parts at the bonding locations. Further, more than just two steps of increasing the power sent to heat sources 42 can be used if so desired.

While certain embodiments of the present invention have been described in detail, those familiar with the art to which this invention relates will recognize various alternative designs and embodiments for practicing the invention as defined by the following claims.

We claim:

1. A method for infrared bonding of a plurality of plastic parts on their bonding surfaces comprising the steps of:

locating the plurality of parts in alignment with one another such that the bonding surfaces are spaced from one another;

inserting at least one infrared heat source between the bonding surfaces;

directing a first predetermined amount of infrared heat at the bonding surfaces for a first time period;

increasing the amount of infrared heat directed at the bonding surfaces to a second predetermined amount for a second time period;

maintaining the at least one infrared heat source substantially stationary relative to the bonding surfaces while the first and second predetermined amounts of heat are being applied;

reducing the amount of infrared heat directed at the bonding surfaces;

removing the at least one infrared heat source from between the bonding surfaces; and pressing the bonding surfaces together, thereby forming bonds between the plurality of parts.

2. A method according to claim 1 further including the step of maintaining at least a minimum amount of infrared heat emission from the at least one infrared heat source, the minimum being greater than zero.

3. A method according to claim 2 further comprising:

monitoring the energy draw for each of the at least one infrared heat sources;

determining the energy made available to each of the at least one infrared heat sources;

indicating a fault condition if anyone of the at least one infrared heat sources draws less than a predetermined percentage of the energy that is made available.

4. A method according to claim 1 further comprising:

monitoring the energy draw for each of the at least one infrared heat sources;

determining the energy made available to each of the at least one infrared heat sources;

indicating a fault condition if anyone of the at least one infrared heat sources draws less than a predetermined percentage of the energy that is made available.

5. A method according to claim 4 wherein the predetermined percentage is 90 percent.

6. A method for infrared bonding of parts made from plastics comprising the steps of:

providing a screw transfer system;

providing a pallet affixed to the screw transfer system;

providing at least one infrared heat source mounted to the pallet for providing heat output;

providing a fixture, including a first platen and a second platen held in space relation from the first platen, and means for mounting the parts to the platens in spaced relation to one another;

providing a controller, operatively engaging the screw transfer system and the at least one heat source, for controlling the screw transfer system and the infrared heat output from the heat sources;

directing a first predetermined amount of infrared heat at the parts for a first time period;

directing a second predetermined amount of infrared heat at the parts for a second time period, said second predetermined amount of infrared heat being greater than said first predetermined amount of infrared heat;

maintaining the at least one infrared heat source substantially stationary relative to the parts while the first and second predetermined amounts of heat are being directed at the parts; and pressing the parts together, thereby forming a bond between the two parts.

7. A method according to claim 6 wherein the step of providing at least one heat source comprises providing an infrared heat lamp with an integral parabolic reflector.

* * * * *